United States Patent
Buchwald et al.

(10) Patent No.: US 7,860,500 B2
(45) Date of Patent: *Dec. 28, 2010

(54) METHOD AND APPARATUS FOR DETERMINING APPROPRIATE CHANNELS FOR COMMUNICATION

(75) Inventors: Gregory J. Buchwald, Crystal Lake, IL (US); Lawrence M. Ecklund, Wheaton, IL (US); Steven F. Gillig, Roselle, IL (US); Terry K. Mansfield, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/626,921

(22) Filed: Jan. 25, 2007

(65) Prior Publication Data

US 2008/0101284 A1 May 1, 2008

Related U.S. Application Data

(60) Provisional application No. 60/863,165, filed on Oct. 27, 2006.

(51) Int. Cl.
*H04B 1/38* (2006.01)

(52) U.S. Cl. .................. 455/434; 370/328; 370/329; 370/338

(58) Field of Classification Search .......... 455/409, 455/434, 450, 452.1, 552.1; 370/328, 329, 370/332, 210
See application file for complete search history.

(56) References Cited

U.S. PATENT DOCUMENTS

| | | | |
|---|---|---|---|
| 4,573,206 A | | 2/1986 | Grauel et al. |
| 5,577,087 A | * | 11/1996 | Furuya ...................... 375/377 |
| 5,781,542 A | * | 7/1998 | Tanaka et al. ............... 370/342 |
| 5,806,002 A | | 9/1998 | Wiatrowski et al. |
| 5,915,219 A | | 6/1999 | Poyhonen |
| 6,011,960 A | * | 1/2000 | Yamada et al. ................ 455/77 |
| 6,442,129 B1 | | 8/2002 | Yonge et al. |
| 6,751,187 B2 | * | 6/2004 | Walton et al. ............... 370/210 |
| 6,909,755 B2 | * | 6/2005 | Erving ....................... 375/264 |
| 6,990,087 B2 | | 1/2006 | O'Donnell |
| 2005/0094212 A1 | | 5/2005 | Asai et al. |
| 2005/0143082 A1 | | 6/2005 | Yang |
| 2005/0221896 A1 | * | 10/2005 | Lum et al. .................... 463/42 |
| 2006/0240777 A1 | | 10/2006 | Ruuska |
| 2006/0268791 A1 | * | 11/2006 | Cheng et al. ................ 370/338 |
| 2007/0140102 A1 | | 6/2007 | Oh et al. |

OTHER PUBLICATIONS

Blaine R. Copenheaver, "PCT/US2007/080668—PCT International Search Report and Written Opinion," WIPO, ISA/US, Commissioner for Patents, Alexandria, VA, USA, Mar. 11, 2008, 8 pages, most relevant pp. 3, 7-8.

(Continued)

*Primary Examiner*—Jean A Gelin

(57) ABSTRACT

During operation of a secondary communication system, nodes having different channel monitoring capabilities or requirements will cooperatively monitor possible frequencies for transmissions, each node using only a subset of all possible modulation sensing schemes. All nodes will share channel occupancy information to other nodes within the communication system. For example, a first group of nodes may monitor possible frequencies for television transmissions, while a second group of nodes may monitor the possible frequencies for APCO 25 transmissions. A group of nodes may also cooperatively monitor possible frequencies for more than one type of modulation transmission. Channel information will be shared among the nodes.

20 Claims, 2 Drawing Sheets

OTHER PUBLICATIONS

Simin Baharlou, "PCT/US2007/080668—PCT International Preliminary Report on Patentability," The International Bureau of WIPO, Geneva, Switzerland, May 7, 2009, 7 pages.

Danijela Cabric, et al., "A Cognitive Radio Approach For Usage Of Virtual Unlicensed Spectrum," 2004, White Paper, Wireless Research Center, University of California at Berkeley, USA and Telecommunication Networks Group, Technical University of Berlin, Germany, Available online http://www.bwrc.eecs.berkeley.edu/MCMA—4 pages.

Danijela Cabric, et al., "Implementation Issues In Spectrum Sensing For Cognitive Radios," 38th Annual Asilomar Conference on Signals, Systems and Computers, Nov. 2004, Wireless Research Center, University of California at Berkeley, USA—5 pages.

LAN/MAN Standards Committee, "6.19 Multicast Support, IEEE P802.22/D0.1—Draft Standard for Wireless Regional Area Networks Part 22: Cognitive Wireless RAN Medium Access Control (MAC) and Physical Layer (PHY) specifications: Policies and Procedures for Operation in the TV Bands" IEEE 2006 pp. 149-150.

LAN/MAN Standards Committee, "6.21.6 Clustering, IEEE P802.22/D0.1—Draft Standard for Wireless Regional Area Networks Part 22: Cognitive Wireless RAN Medium Access Control (MAC) and Physical Layer (PHY) specifications: Policies and Procedures for Operation in the TV Bands" IEEE 2006 p. 202-204.

\* cited by examiner

100

200

METHOD AND APPARATUS FOR DETERMINING APPROPRIATE CHANNELS FOR COMMUNICATION

CROSS-REFERENCE TO RELATED APPLICATIONS

This application is related, and claims priority to provisional patent application No. 60/863,165, filed Oct. 27, 2006, entitled METHOD AND APPARATUS FOR DETERMINING APPROPRIATE CHANNELS FOR COMMUNICATION.

FIELD OF THE INVENTION

The present invention relates generally to determining appropriate channels for communication and in particular, to a method and apparatus for determining appropriate channels for communication within a cognitive radio system.

BACKGROUND OF THE INVENTION

In a cognitive radio system of the type considered for use by IEEE 802-sponsored systems as well as other cognitively-enabled systems under consideration, a cognitive secondary radio system will utilize spectrum assigned to a primary system using an opportunistic approach. With this approach, the secondary radio system will share the spectrum with primary incumbents as well as those operating under authorization on a secondary basis. Under these conditions, it is imperative that any user in the cognitive radio system not interfere with primary users.

A proposed technique for identifying available channels for use by the secondary communication system involves measuring the signal strength of various channels by nodes within the secondary radio system. This information is reported back to a network controller. If the signal strength of any channel is above a predetermined signal level, the network controller prevents secondary devices from transmitting on that channel.

A weakness in the above technique is that for nodes to monitor all possible channels, they must be able to receive and demodulate signals characterized by many differing modulation techniques. For example, a node wishing to transmit within spectrum utilized by television broadcasts will need to be able to receive and demodulate television signals to make sure no television transmissions are taking place. That same node will need to be able to receive and demodulate signals encoded using the 8VSB and DVB-OFDM digital transmissions, legacy NTSC, PAL, and SECAM analog transmissions, secondarily licensed signals such as analog and digital wireless microphone (Part 74) devices, video assist devices, and other protected signals.

Because various modulation techniques will need to be received and demodulated by nodes in a cognitive radio system, expensive hardware and software must be included in these nodes. Thus, while cognitive radio holds the promise of adding additional spectrum for use by users such as public safety, etc., it also has the potential to make radios more expensive. Therefore, a need exists for a method and apparatus for determining appropriate channels for communication within a cognitive radio system that reduces the complexity of nodes required to make such a determination.

DETAILED DESCRIPTION OF THE DRAWINGS

Figure 1:
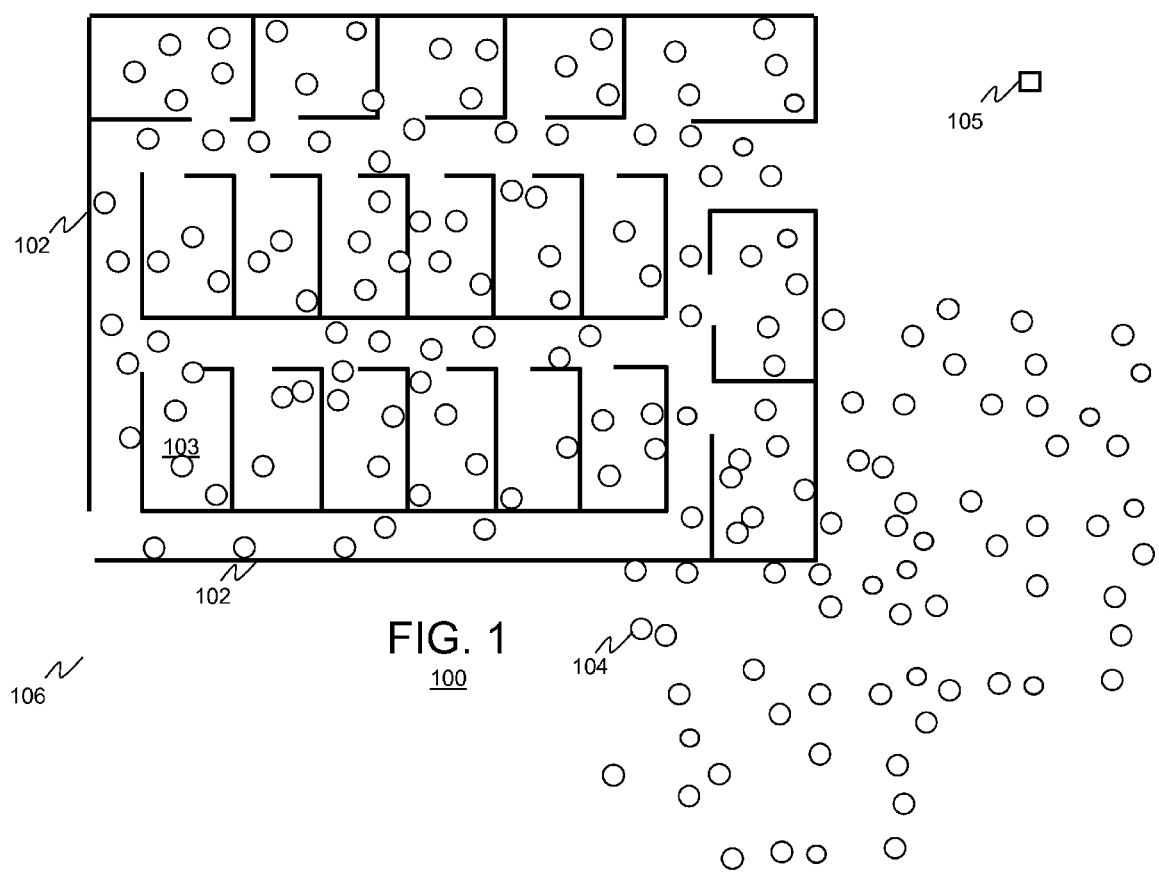
FIG. 1 is a block diagram of a communication system.

In order to address the above-mentioned need, a method and apparatus for determining appropriate channels for communication is provided herein. During operation of a secondary communication system, nodes having different channel monitoring capabilities or requirements will cooperatively monitor possible frequencies for transmissions, each node using a subset of all possible modulation sensing schemes. All nodes will share channel occupancy information to other nodes within the communication system. For example, a first group of nodes may monitor possible frequencies for 8VSB digital television transmissions, while a second group of nodes may monitor the possible frequencies for APCO 25 transmissions. A group of nodes may also cooperatively monitor possible frequencies for more than one type of modulation transmission. Channel information will be shared among the nodes.

Utilizing the above cooperatively monitoring approach, a node will only need to be capable of sensing a small subset of the possible modulation techniques in order to determine if transmissions are taking place. This will allow nodes to be designed that are less complex and less expensive than prior art nodes.

Prior to describing a method for determining the appropriate channels for use, the following definitions set the necessary background information:

Monitoring for transmissions is a general approach to determining whether transmissions exist within a frequency band or within a frequency channel or group of channels. It may consist of directly scanning channels for transmissions utilizing one or more modulation sensing schemes, or it may be an indirect method of determining whether transmissions exist, such as consulting a database, listening for a beacon indicating whether transmissions exist, or it may be a combination of these or other approaches to determining whether transmissions exist.

A transmission modulation technique is the type of modulation encoding used to place information on the radio frequency carrier. Binary Phase Shift Keying (BPSK), Orthogonal Frequency Division Multiplexing (OFDM), and Vestigial Sideband (VSB) are example of modulation techniques.

Modulation sensing scheme is a method to sense transmission of one or more modulation techniques within a frequency band or within a frequency channel or group of channels. Examples of modulation sensing schemes include FM Demodulation, Synchronous Detection, Fast Fourier Transform (FFT) Spectral Detection, and basic Power Sensing. Different modulation sensing schemes may be used to sense the transmission of the same modulation technique or of different modulation techniques.

Additionally, different modulation sensing schemes offer different transmission detection capabilities. Some modulation sensing schemes have more sensitivity than others but are prone to falsing. Others have less sensitivity but are less prone to falsing. For example, a feature detection modulation sensing scheme, which analyzes the modulation looking for particular features and characteristics, has a lower sensitivity than signal strength power detection, but is less prone to falsing. By having different nodes in the group employ different modulation sensing schemes, the overall modulation detection reliability can be improved.

Different modulation sensing schemes also take different lengths of time to detect modulations. By employing different modulation sensing schemes in the nodes, some having shorter modulation detection times than the schemes used by other nodes, the overall time required to detect the existence of modulation can be reduced, thus resulting in improved efficiency in the communication system. For example, by using a continuous monitoring scheme in a portion of the nodes and an intermittent monitoring scheme in other nodes, the detection times can be reduced in those nodes using a continuous monitoring scheme while simultaneously improving the battery life of those nodes using an intermittent monitoring scheme. The above technique also allows for certain nodes to improve their battery life by using a power conserving modulation sensing scheme that differs from the scheme used by other nodes. The battery life of certain nodes can be improved when the spectral characteristics of the transmissions do not need to be determined by all nodes For example, implementing FFT Spectral Detection may require significant more power from the battery or other power source than other more power conserving sensing schemes such as basic RF signal strength power detection. However, an FFT sensing scheme gives more information about the spectral characteristics of the transmissions. It may be sufficient for only a portion of the nodes to analyze the spectral characteristics of the transmissions.

The present invention encompasses a method for determining available channels for communication within a communication system. The method comprises the steps of monitoring a group of channels by a first node using a first modulation sensing scheme. The first modulation sensing scheme differs from a second modulation sensing scheme used for monitoring the channels by at least one other node within the communication system. Next, a determination is made of good and/or bad channels from the group of channels, and then the good and/or bad channels are communicated to the at least one other node within the communication system.

The present invention additionally encompasses an apparatus, the apparatus comprises monitoring circuitry monitoring a group of channels using a first modulation sensing scheme wherein the first modulation sensing scheme differs from a second modulation sensing scheme used for monitoring the channels by at least one other node within the communication system. The apparatus additionally comprises logic circuitry determining good and/or bad channels from the group of channels and a transmitter communicating the good and/or bad channels to the at least one other node within the communication system.

Turning now to the drawings, wherein like numerals designate like components, FIG. 1 is a block diagram of communication system 100 deployed inside and outside an interior of an office building. The office building comprises perimeter wall 102 that encloses a plurality of rooms 103 (only one labeled). Communication system 100 is preferably a cognitive radio system that comprises a number of wireless devices 104-105 involved in determining a particular channel/frequency for transmission and reception.

Circular objects, or nodes 104 (only one labeled) represent wireless devices that operate as part of a secondary communication system, and utilize spectrum assigned to a primary communication system using an opportunistic approach. With this approach, secondary nodes 104 will share the spectrum with primary nodes (not shown) as well as those operating under authorization on a secondary basis. It should be noted that wireless devices 104 are considered part of communication system 100 in that they share information on available channels. It is not necessary that wireless devices 104 are capable of wireless communication between each other. In fact, wireless devices 104 may be utilizing different communication system protocols for communications.

Rectangular objects represent a wireless device that operates as a controller/coordinator 105 to assign channels within cognitive radio system 100. As part of channel assignment, controller 105 will receive a list of available channels from nodes 104, and will assign nodes 104 appropriate channels for communication. Thus, all nodes 104 within communication system 100 will receive channel assignments from controller 105.

It should be noted that although FIG. 1 shows nodes 104 existing within a two-dimensional space, one of ordinary skill in the art will recognize that nodes 104 may be located in other environments, including 3-dimensional spaces. For example, nodes 104 may comprise public safety first responder radio equipment located within a multi-level building, golf carts equipped with wireless transceivers located on a golf course, inventory tags located within a multi-level warehouse, . . . etc.

Irrespective of the environment where nodes 104 operate, it is imperative that any node in the cognitive radio system not interfere with primary users. In order to avoid interfering with users of the primary communication system, nodes 104 will measure the signal strength and/or other parameters of potential channels/frequencies using at least one modulation sensing scheme. A list of good channels is passed back to controller 105. If the signal strength of any channel is above a predetermined signal level, nodes 104 will be prohibited from transmitting on that channel.

As discussed above, a weakness of above interference-avoidance technique is that for prior-art nodes to be able to monitor all possible channels for communication they must be equipped with the necessary hardware and software to decode signals transmitted via multiple modulation techniques. In order to address this issue, nodes 104 will only monitor for primary transmissions characterized by a subset of all possible modulation techniques (possibly only a single modulation technique). Nodes 104 will share channel information (i.e., if a particular channel is occupied) with other nodes 104. This may be done via passing/communicating the information to controller 105 causing controller 105 to share the channel information with other nodes 104.

It should be noted that various nodes 104 will be equipped with differing demodulation capabilities and may be incapable of monitoring using all modulation sensing schemes. For example, certain nodes 104 will be able to demodulate television transmissions; while other nodes will not be able to demodulate such transmissions, but may be equipped to demodulate other forms of transmissions. Furthermore, certain nodes 104 will be able to detect television transmissions using one form of detection scheme; while other nodes will not be able to use the same form of detection scheme, but may be able to detect such transmissions using another form of detection scheme. Thus, for example, a node will scan a group of channels using a first modulation sensing scheme wherein the first modulation sensing scheme differs from a second modulation sensing scheme used for monitoring the channels by at least one other node within the communication system. The node will determine good and/or bad channels from the group of channels and then communicate the good and/or bad channels to the one other node within the communication system. The group of channels comprises a first group of frequencies, a first group of frequency/timeslots, or a first group of channelization codes.

Because all nodes will report back to controller 105, and because controller 105 will share channel occupancy information to all nodes 104, the first node may be prevented from communicating on a channel that it perceived as having no primary transmissions. More particularly, since the second node may have detected transmissions on the particular channel using the second modulation sensing scheme, the first node may have perceived that no transmissions were taking place, since the first node was sensing the channel for transmissions using the first modulation sensing scheme. Using this scheme all nodes 104 will receive information about good and/or bad channels from other nodes within the communication system. Although in a preferred embodiment this is accomplished by simply receiving a list of good and/or bad channels from controller 105, nodes 104 that are capable of communications among themselves may simply share this information directly between themselves.

Once a good channel has been identified by a node, the node may utilize the channel for communications as part of a secondary communication system within a cognitive radio system. In other words, the good channel will be utilized by a primary communication system at will, but the secondary radio system will share the spectrum with primary incumbents on a secondary basis.

Good or bad channel determination is not necessarily arrived at by consensus among all nodes. The determination may be the result of combining the individual nodes sensing results using an algorithm to improve transmission detection reliability.

Figure 2:
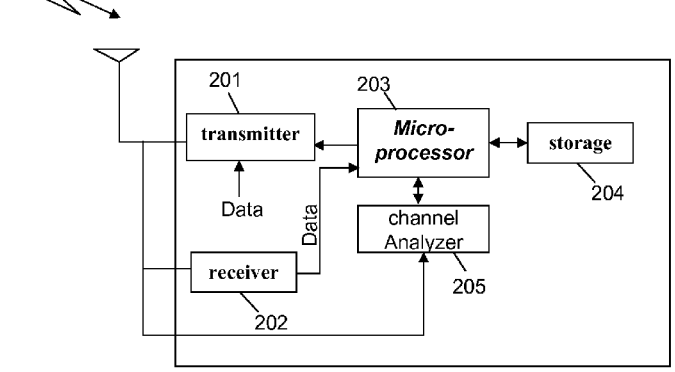
FIG. 2 is a block diagram of a node of FIG. 1.

FIG. 2 is block diagram of node 104. As shown, node 104 comprises logic circuitry 203 (microprocessor 203), receive circuitry 202, and transmit circuitry 201, storage 204, and channel analyzer 205. Logic circuitry 203 preferably comprises a microprocessor controller, such as, but not limited to a Freescale PowerPC microprocessor. In the preferred embodiment of the present invention logic circuitry 203 serves as means for controlling node 104. Channel analyzer 205 serves as means for analyzing particular channels for transmissions transmitted using a particular modulation scheme to determine if they are suitable for use. Additionally receive and transmit circuitry are common circuitry known in the art for communication utilizing a well known communication protocol, and serve as means for transmitting and receiving messages. For example, receiver 202 and transmitter 201 are well known transmitters that utilize the IEEE 802.22 communication system protocol. Other possible transmitters and receivers include, but are not limited to transceivers utilizing Bluetooth, IEEE 802.11, or HyperLAN protocols.

Figure 3:
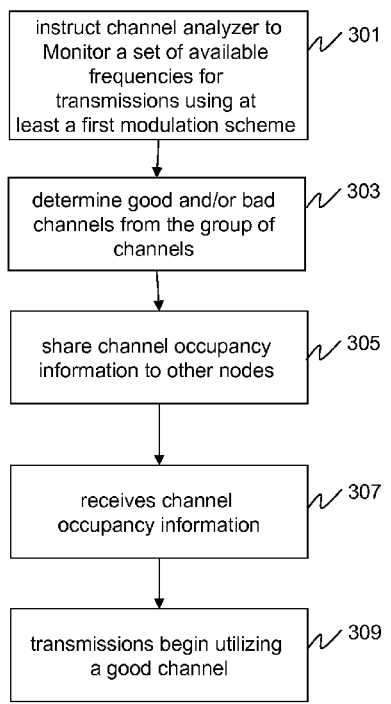
FIG. 3 is a flow chart showing operation of the node of FIG. 2.

FIG. 3 is a flow chart showing operation of node 200 of FIG. 2. The logic flow of FIG. 3 assumes that node 200 is operating as a secondary communication system, and that transmissions on a particular frequency by a primary communication system (using any modulation technique) will prevent node 200 from using the particular frequency. The logic flow begins at step 301 where logic circuitry 203 instructs channel analyzer 205 to monitor a set of available frequencies for transmissions using at least a first modulation sensing scheme. As discussed above, the first modulation sensing scheme differs from a second modulation sensing scheme used for monitoring the channels by at least one other node within the communication system. At step 303 logic circuitry 203 determines good and/or bad channels from the group of channels and instructs transmitter 201 to share channel occupancy information to other nodes 104 (step 305). In the preferred embodiment of the present invention this step entails the transmission of channel occupancy information to controller 105, causing controller 105 to share the information with other nodes 104. However, in an alternate embodiment of the present invention, nodes 104 may simply share channel occupancy information directly between each other. Regardless of how channel occupancy information is shared among nodes, all nodes 104 will receive channel occupancy information as reported by other nodes in the secondary communication system.

At step 307, receiver 202 receives channel occupancy information from the other nodes 104 (preferably via controller 105). This information is stored in storage 204. Finally, at step 309, transmissions begin with either transmitter 201 or receiver 202 utilizing a good channel on a secondary basis.

Because other nodes will have monitored the set of available channels for transmissions using other modulation sensing schemes, node 200 may be prevented from communicating on a channel that was perceived as being unoccupied. For example, if a second node 104 determined that transmissions were taking place on the channel using a second modulation sensing scheme, channel analyzer 205 may not have detected such transmissions, since it was monitoring the channel for transmissions utilizing the first modulation sensing scheme. Thus, even though node 200 perceived the channel as having no primary transmissions existing on it, the primary communication system may have been transmitting on the channel utilizing a modulation that wasn't detected by the modulation sensing scheme used by node 200.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for determining available channels for communication within a communication system, the method comprising the steps of:
    monitoring a group of channels for transmissions by a first node using a first modulation sensing scheme wherein the first modulation sensing scheme differs from a second modulation sensing scheme used for monitoring the group of channels by a second node, and wherein the first node is incapable of monitoring the group of channels using the second modulation sensing scheme;
    determining good and/or bad channels from the group of channels;
    communicating the good and/or bad channels to the second node.

2. The method of claim 1 wherein the first node and the second node monitors for a same modulation transmission using the first and the second modulation sensing schemes, respectively.

3. The method of claim 1 wherein the step of communicating the good and/or bad channels comprises the step of communicating the good and/or bad channels to a controller, causing the controller to communicate the good and/or bad channels to the second node.

4. The method of claim 1 wherein the group of channels comprises a group of frequencies, a group of frequency/timeslots, or a group of channelization codes.

5. The method of claim 1 further comprising the step of:
    receiving information about good and/or bad channels from other nodes within the communication system.

6. The method of claim 1 further comprising the step of:
    receiving a list of good and/or bad channels from a system controller.

7. The method of claim 1 further comprising the step of:
    utilizing a good channel for communication.

8. The method of claim 7 wherein the step of utilizing the good channel for communication comprises the step of utilizing the good channel for communication as part of a secondary communication system in a cognitive radio system.

9. The method of claim 1 wherein the first modulation sensing scheme comprises an FFT modulation sensing scheme and the second modulation sensing scheme comprises a signal strength modulation sensing scheme.

10. The method of claim 1 wherein the first node monitors the group of channels for transmissions continuously and the second node monitors the group of channels for transmissions intermittently.

11. The method of claim 1 wherein the first modulation sensing scheme comprises direct channel scanning and the second modulation sensing scheme comprises listening for a beacon.

12. The method of claim 1 wherein the first modulation sensing scheme comprises a feature detection sensing scheme and the second modulation sensing scheme comprises a signal strength modulation sensing scheme.

13. A node comprising:
monitoring circuitry monitoring a group of channels using a first modulation sensing scheme wherein the first modulation sensing scheme differs from a second modulation sensing scheme used for monitoring the channels by a second node within the communication system, and wherein the node is incapable of monitoring the group of channels using the second modulation sensing scheme;
logic circuitry determining good and/or bad channels from the group of channels; and
a transmitter communicating the good and/or bad channels to the second node within the communication system.

14. The node of claim 13 wherein the second node is incapable of monitoring using the first modulation sensing scheme.

15. The node of claim 13 wherein the good and/or bad channels are communicated by the transmitter to a controller, causing the controller to communicate the good and/or bad channels to the second node.

16. The node of claim 13 wherein the node is part of a group of nodes cooperatively monitoring for transmissions.

17. The node of claim 13 further comprising:
a receiver receiving information about good and/or bad channels from other nodes within the communication system.

18. The node of claim 13 further comprising:
a receiver receiving a list of good and/or bad channels from a system controller.

19. The node of claim 13 wherein the transmitter additionally utilizes a good channel for communication.

20. The node of claim 13 wherein the transmitter additionally utilizes a good channel for communication as part of a secondary communication system in a cognitive radio system.

* * * * *

UNITED STATES PATENT AND TRADEMARK OFFICE
CERTIFICATE OF CORRECTION

| | |
|---|---|
| PATENT NO. | : 7,860,500 B2 |
| APPLICATION NO. | : 11/626921 |
| DATED | : December 28, 2010 |
| INVENTOR(S) | : Buchwald et al. |

It is certified that error appears in the above-identified patent and that said Letters Patent is hereby corrected as shown below:

On the Face Page, in Field (56), under "U.S. PATENT DOCUMENTS", in Column 2, Line 8, delete "O'Donnell" and insert -- Rao et al. --, therefor.

On the Face Page, in Field (56), under "U.S. PATENT DOCUMENTS", in Column 2, insert missing reference -- 6,990,887 B1    1/2006    O'Donnell --, therefor.

Signed and Sealed this
Thirty-first Day of July, 2012

David J. Kappos
*Director of the United States Patent and Trademark Office*